Patented Apr. 5, 1927.

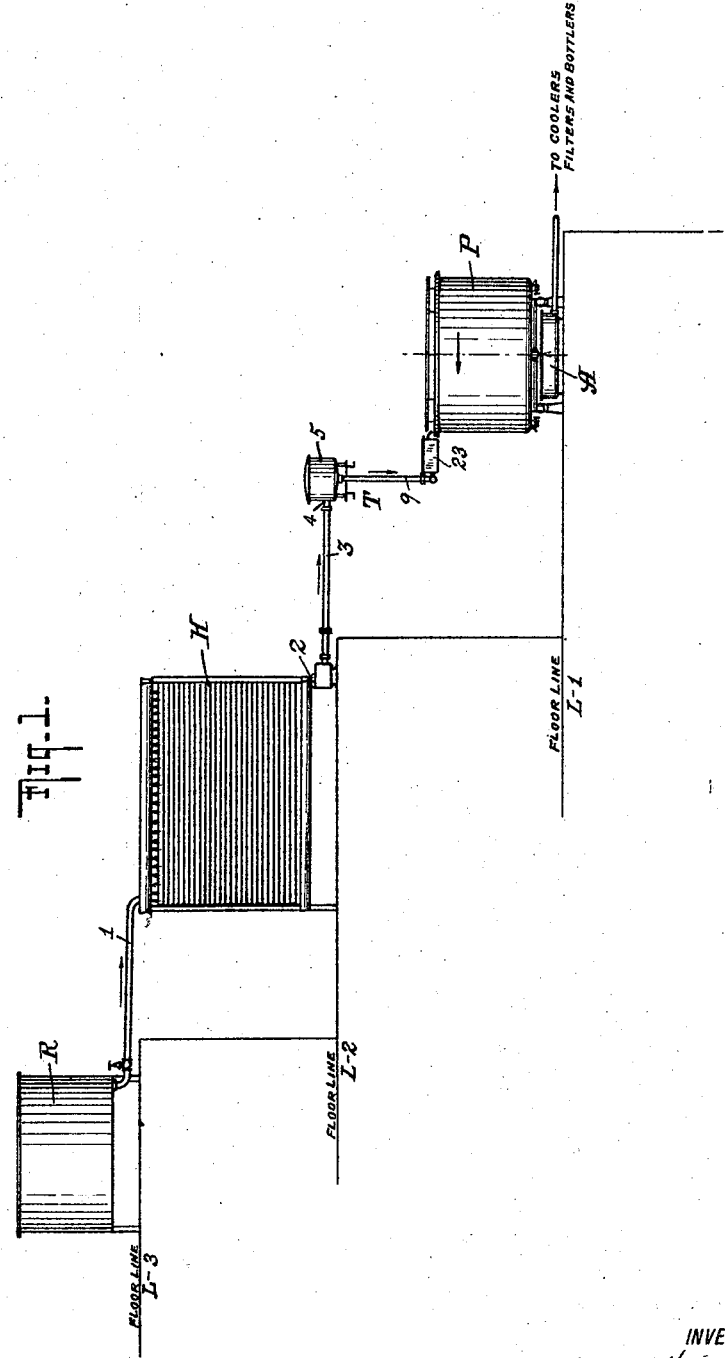

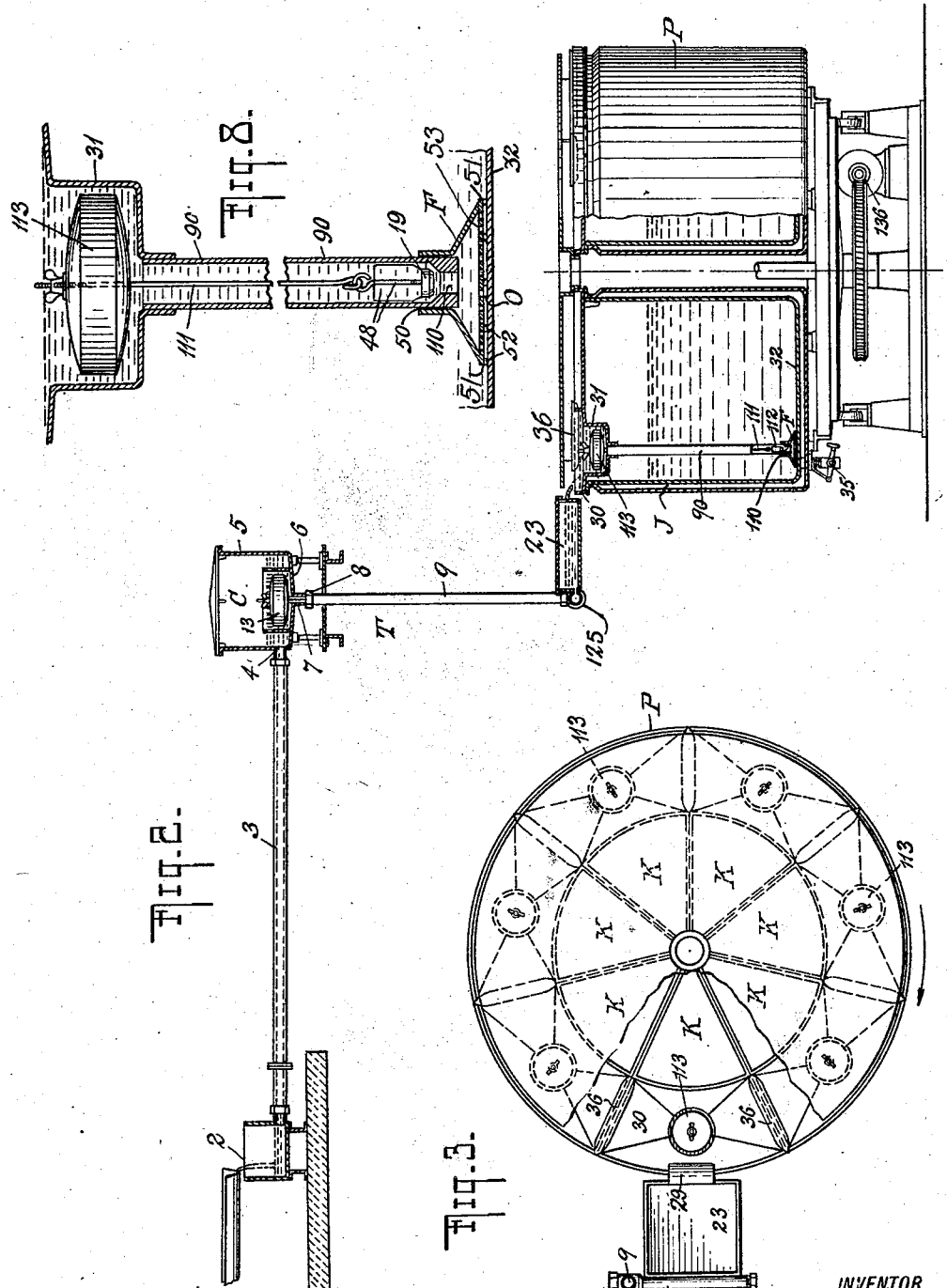

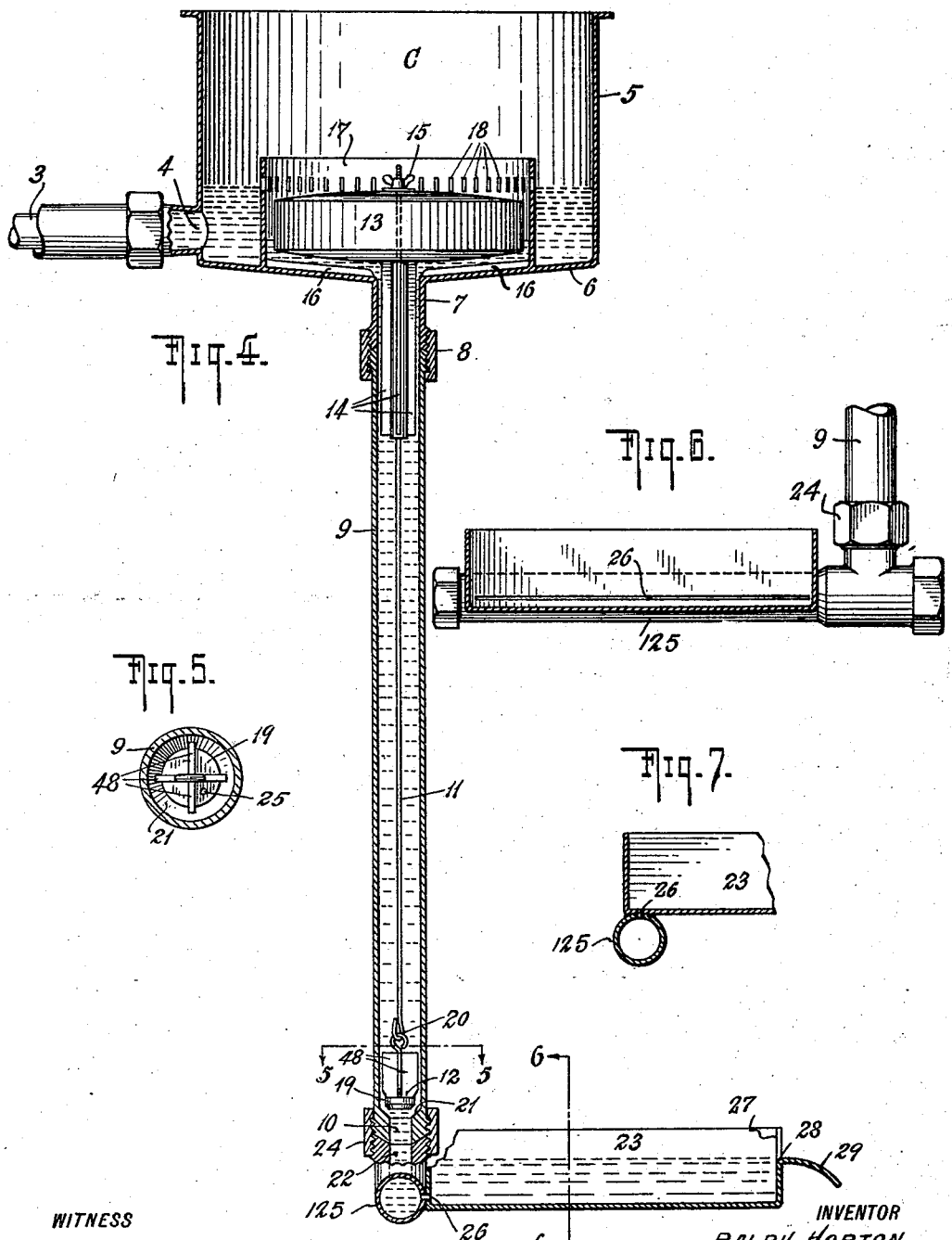

1,623,313

UNITED STATES PATENT OFFICE.

RALPH HORTON, OF NEW YORK, N. Y.

MILK-TRANSFER SYSTEM.

Application filed September 1, 1926. Serial No. 132,991.

This invention relates to milk Pasteurizing systems, and more particularly to that part thereof which deals with the transfer of milk from one element to another, especially to the holding tank.

The Pasteurization of milk is effected by heating the milk to a critical temperature which is normally between 138° to 145° F., and then holding the milk at this temperature for a definite period which is usually taken as thirty minutes. In carrying out the foregoing procedure the raw milk is first pumped into a reservoir, then to a heater which brings the cold milk up to a Pasteurizing temperature, and finally to a holder which maintains the milk at the Pasteurizing temperature for the proper period of time. As the milk is transferred from one element to another, foam forms and accumulates on the top of the body of liquid milk. When this milk is discharged into the holder, more air is sucked in from the atmosphere which causes the formation of further amounts of foam. As the temperature of the air ranges from about 70° to 80° F., the temperature of the enveloping milk, i. e. the outer phase of the foam, is reduced below the critical Pasteurizing temperature. The foam may fall to a temperature of say 128° F. which is below the danger point where bacteria and other microscopic organisms can continue to exist and to grow, and will not be destroyed. Since the trapped air is in small cells in the foam, the latter forms an ideal insulating agent which prevents any substantial heating of the milk dispersed in the foam. Consequently, even if the milk holder is of a heated or jacketed type, the bacteria and the like carried in the foam are not destroyed so that the entire body of milk will be contaminated when the milk and foam are drawn off from the holder. It is therefore obvious that in the present Pasteurizing systems, the Pasteurizing benefits may be partially or wholly vitiated.

It is a primary object of the present invention to cause a transfer of milk in the Pasteurizing system in a substantially foamless condition, and to heat and hold the entire body of substantially foamless milk to the Pasteurizing temperature for the Pasteurizing period.

A further object of the invention is to provide means for transferring milk from one element to another in the Pasteurizing system in the liquid state only and to prevent the creation or transfer of foam.

Another object of the invention is to provide the feeding device of the milk holder with a weir-discharge pan which acts as a reservoir and a pressure-release for the milk being conveyed to the holder so that the milk discharges from the weir of the pan into the holder as a smooth sheet of liquid flowing with a substantially low velocity and without the formation of substantial quantities of foam.

Other features and advantages of the invention will be made clear by a description of a certain preferred Pasteurizing system containing embodiments of my invention, as illustrated in the accompanying drawings, in which Fig. 1 is a diagrammatic illustration of a preferred milk Pasteurizing system with embodiments of my invention incorporated therein; Fig. 2 is an enlarged elevational view, partly in section, of the lower portion of the system shown in Fig. 1; Fig. 3 shows a plan view of the rotary positive milk holder and the weir-discharge pan shown in Fig. 2; Fig. 4 is a sectional view on an enlarged scale of the transfer device and weir-discharge pan shown in Fig. 2; Fig. 5 is a sectional view on the line 5—5 of Fig. 4; Fig. 6 shows a sectional view on the line 6—6 of Fig. 4; Fig. 7 is a fragmentary view illustrating a modified inlet connection for the weir-discharge pan and Fig. 8 is a fragmentary view partly in section of one of the transfer devices positioned in the positive rotary holder shown in Fig. 2.

Similar characters of reference designate similar parts throughout the accompanying drawings.

The invention will be described generally in connection with a gravity flow Pasteurizing system illustrated diagrammatically in Fig. 1, although it is just as applicable to systems in which all of the elements are located at one or more levels with pumps associated therewith for transferring the milk from one element to another. In Fig. 1 the letter R designates a raw milk reservoir which is situated at the highest level $L^3$ so that a gravity flow may be maintained in the system. The milk flows from the reservoir through pipe 1 to a heater H of any approved type which heats the cold raw milk to about the Pasteurizing temperature. From the outlet 2 of the heater the heated milk is transferred in liquid state substantially free from foam to the positive holder P by my improved transfer device denoted generally by T. After the milk is held in the holder for the prescribed time, it is discharged into a tank A which is connected to any well known cooling, storing, and bottling system (not shown).

Heretofore, the milk was conveyed from the one element to another without any means to prevent and to eliminate the creation and accumulation of foam. This is of especial importance in the transfer from the heater to the holder where there is a substantial drop in level and a considerable tendency of the milk to foam. Unless there is an absence of substantially all foam at this point and in the holder, it is practically impossible to maintain uniform temperature conditions, particularly in the layer of floating foam, and to Pasteurize the milk, as noted heretofore.

In accordance with the present invention the liquid transfer device T is employed at every place where there is a difference in level between the incoming and discharging liquid. Generally speaking, the transfer device T only operates when subjected to the action of a head of liquid a little greater than the difference in levels of the inlet and outlet of the transfer device so that substantially no foam is transferred from one element to another. By incorporating a transfer device in the milk holder only liquid is discharged therein which holds its temperature to within a few degrees. As a substantially uniform temperature may be maintained throughout the entire body of milk, all of the milk is Pasteurized, and there is no possibility of recontamination with un-Pasteurized milk in the holder itself.

The transfer device is illustrated in detail in Fig. 4 wherein the numeral 3 designates a pipe joining the outlet 2 of the heater with an inlet 4 of a chamber C. This chamber may have any approved form, such as a cylindrical shell 5 with a sloping bottom 6 at the central portion of which is a projecting tube 7. Connected to tube 7, by any suitable means, as a union connection 8, is a conduit 9, preferably of sufficient cross-section so that the velocity of the milk flowing downwardly is not enough to cause bubbles to be carried along with the milk, but will afford the said bubbles an opportunity of rising to the top of the column instead of being carried to the bottom, which has a length corresponding substantially to the height between outlet 10 and inlet 3 of the transfer device. Within the conduit 9 is a rod 11 at the lower end of which is a valve 12 and at the upper end of which is a float 13. The float is preferably one of flat type with a bulged top and bottom having a substantially large superficial area. A winged guide sleeve 14 passes through the center of and projects from the bottom of the float so as to be capable of sliding on rod 11. In order to provide an engagement between rod 11 and float 13 an adjustable thumb screw 15 is provided at the top of the rod 11. When the float is in its inactive position, it is out of contact with thumb screw 15 and in contact with a plurality of spaced rests 16 which are positioned adjacent to the bottom of chamber C and within baffle ring 17. This ring protects the float 13 against the inrushing milk from inlet 4, so that the milk fills up chamber C to a height determined by the level of the overflow holes 18. By providing the ring 17 about its entire periphery with holes 18, a uniform flow may be established between chamber C and the float chamber formed by the said ring.

The valve 12 which is connected to the lower end of the rod 11 by ring connection 20 is of the poppet type having a plurality of guide vanes 48 at the upper part thereof and a disk 19 at the lower part. The disk fits in a seat 21 provided on the inner walls of conduit 9, so that the valve shuts off the flow of liquid when it is in its lowermost position. In order to drain any residual liquid in conduit 9, a small hole 25 is provided in disk 19.

The outlet 10 of conduit 9 is shown joined to inlet 22 of a weir discharge pan 23 by a union connection 24. Inlet 22 is associated with a feed pipe 125 which is positioned at the back of pan 23 and connected to a long narrow inlet port 26. This port has a length equal preferably to that of the weir discharge pan and a location near the bottom of said pan as shown in Fig. 6 or in the bottom as shown in Fig. 7. By this arrangement the incoming liquid is introduced beneath the surface of the liquid held in the pan at such a low velocity that practically no disturbance is made in the body of the liquid. In this manner a transfer may be effected at this point without the formation of detrimental amounts of foam. The pan may have either a suppressed or contracted weir according to the particular conditions, but is herein shown with a contracted weir 27. This weir has a substantially sharp crest 28, so that the discharging liquid flows from the pan as a smooth sheet of liquid free from any substantial quantities of spray. The overflowing liquid is guided by lip 29 into a catch pan 30 positioned in one of the compartments of the positive holder P, as may be seen in Fig. 2. The holder P contains a plurality of similar compartments K which are provided with a steam jacket J, a discharge outlet 35, and a catch pan with related parts. The catch pan has a sump 31 therein which houses the float 113 of another transfer device T. This device is substantially the same as the one described heretofore in that it has a conduit 90 within which is a rod 111 or other suitable connecting means. The lower end of rod 111 is provided with a valve 112 to control the flow through outlet 110 which is adjacent to the floor 32 of one of the compartments K of this holder. As noted heretofore with respect to conduit 9 the cross-section of conduit 90 is of sufficient area so that the velocity of the milk flowing downwardly is not great enough to cause bubbles to be carried along with the milk. The lower end of conduit 90 should be located as close to the floor 32 as possible to prevent any splashing or foaming and to form a liquid seal quickly. However, if the conduit 90 has an initial length such as to bring its lower end close enough to the floor 32 to satisfy the foregoing requirements the daily or periodic dismantling, handling, cleaning, and reassembling of the parts is likely to result in an increase or decrease in the small gap between the end of conduit 90 and floor 32. Both of these conditions are objectionable. To meet the situation I shorten the pipe 90 and establish a sliding connection with an associated member, said member providing for a predetermined gap of fixed and immutable height above the floor 32. Then if the conduit 90 and its supporting elements become bent or otherwise affected by manipulations to cause the lower end of 90 to reach to relatively higher or lower levels it will be immaterial because the gap O remains unchanged. In each compartment I have therefore found it preferable to slip a funnel F over the lower end of conduit 90 so that there is as little clearance as possible between the conduit and the inner surface 50 of the funnel. The lower edge 51 of the funnel is supported by a plurality of lugs 52, thus leaving a very small gap of predetermined and fixed height, say one-eighth of an inch. With that arrangement, complete submergence of the milk outlet O as soon as the milk level in the tank covers the gap, or in the example stated, as soon as one-eighth of an inch of milk has flowed into the tank. By this arrangement the distance between the bottom edge of the funnel and the bottom of the tank will be permanently maintained as a gap of predetermined minimum depth and any irregularities in the apparatus due to frequent dismantling, handling, washing, reassembling, etc. is taken up by the slip joint between the funnel F and pipe 90 without causing any alteration in the relative arrangement of the related parts and mechanism. As this gap or outlet O has a considerable area the velocity of the outflowing milk is very low and hence no turbulence or foaming occurs at this point. In order to prevent any possibility of splashing within the funnel a perforated plate 53 is secured at the lower end of the funnel. After the milk leaves the outlet 10 it passes the plate 53 and flows out smoothly through the holes in the plate.

In the operation of a Pasteurizing system having my invention incorporated therein, the cold raw milk is first pumped to the highest level into a reservoir R. The milk flows by gravity from this reservoir into a heater H which heats the milk up to a Pasteurizing temperature. The conduit 3 conducts the heated milk from outlet 2 of the heater to the transfer device T which delivers the milk to a lower level, to wit, the top of the continuous positive milk holder P. As the milk enters the transfer device it flows into chamber C up to the height of the overflow holes 18 in the baffle ring. The milk then flows through holes 18 into the float chamber and beneath the float which is supported on rests 16 into conduit 9. This conduit fills up quickly to the bottom of the float. Due to the fact that there is a little play between the top of the float and the thumb screw the float must be raised by the milk and brought into engagement with the thumb screw. As the liquid level in the float chamber rises, the float is carried upwardly with valve 12 which is operatively connected thereto through rod 11. When valve 12 is lifted entirely free from seat 21, the maximum quantity of liquid feed to the transfer device is able to discharge through outlet 10. Normally the amount of liquid feed is less than the maximum amount and usually there is a variation of the said feed. As these variations in flow occur, the height of the float and valve varies accordingly, so that the discharge orifice as determined by the bottom of the valve and the seat also varies. This arrangement provides an automatic control of the discharge in accordance with variations in the feed.

There is no possibility of foam being transferred from the chamber C to the outlet of conduit 9 because the float only opens the valve 12 when the head of liquid is substantially longer than conduit 11. If any foam is formed, it merely floats on the top of the liquid in the annular space between the baffle ring 17 and the float 13. The liquid discharged from outlet 10 to inlet 22 of the weir discharge pan is substantially foamless. As this foamless liquid is discharged at low velocity into and below the surface of the liquid in the said pan, there is substantially no creation of foam at this point of the system. The liquid discharges from the weir discharge pan as a smooth sheet of liquid substantially free from spray, bubbles or foam into the catch pan of a compartment K of the positive milk holder P. (This holder is herein illustrated as one of the continuous rotary type, although any holder of approved type may be used.) The holder is rotated through suitable mechanism, such as a worm and gear 136, at such a speed that each compartment is filled as it passes the weir discharge pan. A saddle 36 is provided at each compartment partition to divert the flowing milk into adjacent catch-pans. The milk is conducted from each catch pan in the top of the holder to the bottom thereof by a transfer device placed in sump 31. The action of this transfer device is the same as the one described heretofore, and therefore the action need not be repeated. Foamless milk discharges from the outlet of the conduit 90 via the funnel F, and a liquid seal is quickly formed thereunder so that the discharge takes place under the seal and out of contact with the air. In this manner the compartment of the milk holder may be filled without the formation of any substantial quantities of foam, i. e. the mass of milk in the compartment is practically all in the liquid state. When the milk is in this condition, it may be maintained at a Pasteurizing temperature for the prescribed period, so that only Pasteurized milk will be discharged from the holder through a controlled outlet 35.

It will be observed that my invention provides means whereby liquids may be transferred from one elevation to another in a practically foamless condition.

It will be further noted that my invention provides a milk Pasteurizing system with a method and means whereby milk may be Pasteurized completely in a practically liquid state without any possibility of recontamination by un-Pasteurized foam.

I claim:

1. A milk transfer device comprising a float chamber having an inlet for the milk to be transferred, a float positioned within said float chamber, a transfer conduit leading from said float chamber to a lower level, a valve positioned in said transfer pipe in the region of said lower level, and means connecting said float to said valve in such manner that the valve unseats itself to open the lower end of the conduit only when the liquid column between the valve and the upper part of the float chamber has become so materially longer than the conduit that only liquid will pass into said conduit.

2. A milk transfer device comprising a float chamber having an inlet for the milk to be transferred, a float positioned within said float chamber, a transfer conduit leading from said float chamber to a lower level, a valve positioned in said transfer pipe in the region of said lower level, and means connecting said float to said valve in such manner that the valve automatically unseats itself to open the lower end of the conduit only after and so long as the conduit is completely filled with milk and to a variable extent depending upon and limited by the rate of flow into the column and the resultant fluctuations in the elevation of the liquid level in the float chamber.

3. A milk transfer device comprising a float chamber, a transfer pipe connected to said float chamber, a float in the float chamber, a valve in the transfer pipe near the lower end thereof, a connection between the float and the valve adapted to cause unseating of the valve only so long as the transfer pipe is completely filled with milk, the transfer pipe being so dimensioned as to limit the velocity of the downwardly flowing milk to a speed not sufficiently rapid to cause the milk to permit any substantial amount of bubbles to be carried along with the milk while flowing through the transfer pipe, but to allow such bubbles to rise upwardly in the column of milk in the transfer pipe.

4. A milk transfer device comprising a float chamber, having an upright wall, a float in said chamber having substantially the same area as that of the float chamber, a transfer pipe connected with the bottom of said float chamber, a valve in the transfer pipe near the lower end thereof, a connection between the float and the valve adapted to cause unseating of the valve only so long as the transfer pipe is completely filled with milk, the transfer pipe being so dimensioned as to limit the velocity of the downwardly flowing milk to a speed not sufficiently rapid to cause the milk to permit any substantial amount of bubbles to be carried along with the milk while flowing through the transfer pipe, but to allow such bubbles to rise upwardly in the column of milk in the transfer pipe.

5. A milk transfer device as set forth in claim 1 in which the valve member has guide vanes incorporated therewith to maintain the position of the valve in the transfer conduit without materially obstructing the flow of milk past the valve when in the open position.

6. A milk transfer device as set forth in claim 1 in which the float chamber is constructed to include a cylindrical baffle surrounding the float and provided with a plurality of over-flow orifices at the upper part thereof to cause milk from the outer part of the float chamber to pass through the said orifices into the annular space within the baffle and thence beneath the float into the transfer conduit.

7. A milk transfer device as set forth in claim 1, in which the float in the lowest position is spaced sufficiently from the bottom of the float chamber to allow fluid to flow freely into the transfer conduit beneath the float and when said transfer conduit has been filled and the liquid level in the float chamber continues to rise, to lift the float in the float chamber.

8. A milk transfer device as set forth in claim 1, in which the lower end of the transfer conduit terminates above the bottom of the transfer means for delivering milk to the vessel to which the milk is transferred and a member resting upon the bottom of said vessel and affording fixed openings for milk to enter said vessel from said member is interposed between said bottom and the lower end of the transfer conduit and has closed sliding connection with the latter, whereby, irrespective of variations as between the lower end of the transfer conduit and the bottom of the vessel there will be uniformity of flow of the milk into said vessel through the openings in the said member.

9. In a milk Pasteurizing system comprising a rotary multi-compartment milk holder having heating means incorporated therein to effect Pasteurization of the milk in its several compartments, a cover for each compartment developed as a float chamber and milk transfer means associated with each compartment to transfer milk to the bottom thereof and constituted of the combination set forth in claim 1, a foam-preventing milk transfer means for delivering milk to the compartments of the milk holder successively, said milk transfer means being likewise of the character set forth in claim 1 and terminating in a weir discharge device whereby the milk from the transfer conduit is caused to flow as a relatively smooth sheet of milk without substantial fall upon the cover portion at the upper part of the compartments of the milk holder.

10. In a milk transfer device of the character set forth in claim 1, a discharge pan associated with the outlet of the transfer conduit, said pan terminating at one side in a weir, a multi-compartment Pasteurizing tank fed from said weir successively, each compartment of said Pasteurizing tank being in turn provided with a milk transfer device of the same character as that set forth in claim 1.

In testimony whereof I have hereunto set my hand.

RALPH HORTON.